US006918358B2

(12) United States Patent
Hu

(10) Patent No.: US 6,918,358 B2
(45) Date of Patent: Jul. 19, 2005

(54) EIGHT-STROKE INTERNAL COMBUSTION ENGINE UTILIZING A SLAVE CYLINDER

(76) Inventor: Lung Tan Hu, 19620 50A Ave., Langley, BC (CA), V3A 7L2

( * ) Notice: Subject to any disclaimer, the term of this patent is extended or adjusted under 35 U.S.C. 154(b) by 20 days.

(21) Appl. No.: 10/619,147

(22) Filed: Jul. 15, 2003

(65) Prior Publication Data

US 2004/0123821 A1 Jul. 1, 2004

(51) Int. Cl.$^7$ ............................................. F02M 25/07
(52) U.S. Cl. .................................. 123/58.8; 123/198 F
(58) Field of Search ............................ 123/58.8, 198 F

(56) References Cited

U.S. PATENT DOCUMENTS

| 3,896,774 | A | * | 7/1975  | Siewert         | 123/58.8 |
| 3,958,540 | A | * | 5/1976  | Siewert         | 123/58.8 |
| 4,157,080 | A | * | 6/1979  | Hill            | 123/52.5 |
| 4,159,699 | A | * | 7/1979  | McCrum          | 123/58.8 |
| 4,159,700 | A | * | 7/1979  | McCrum          | 123/58.8 |
| 4,202,300 | A | * | 5/1980  | Skay            | 123/432  |
| 4,321,892 | A | * | 3/1982  | Anger           | 123/58.8 |
| 4,917,054 | A | * | 4/1990  | Schmitz         | 123/58.8 |
| 6,308,666 | B1 | * | 10/2001 | Drecq          | 123/58.8 |
| 6,328,003 | B1 | * | 12/2001 | Gaertner et al.| 123/58.8 |
| 6,386,154 | B1 | * | 5/2002  | Hellman et al. | 123/58.8 |

* cited by examiner

Primary Examiner—Henry C. Yuen
Assistant Examiner—Jason Benton
(74) Attorney, Agent, or Firm—Rosenberg, Klein & Lee

(57) ABSTRACT

By the utilizing of a slave cylinder working in coordination with a master cylinder, the slave cylinder both receives cool atmospheric air and receives hot, partially un-burnt exhaust gases from the master cylinder to create a second power-stroke in the slave cylinder. With the two coordinating cylinders, the entire working process is from 0 to 810 degrees of revolution crankshaft. The master cylinder cycles work from 0 to 720 degrees of revolution and slave cylinder cycles work from 90 to 810 degrees of revolution. The master cylinder begins to intake air and fuel at 0 degree of revolution and slave cylinder begins to intake air at 90 degrees of revolution. There is an angle of 60–120 degrees differences between master and slave cylinder, where the slave cylinder is trailing the master.

16 Claims, 5 Drawing Sheets

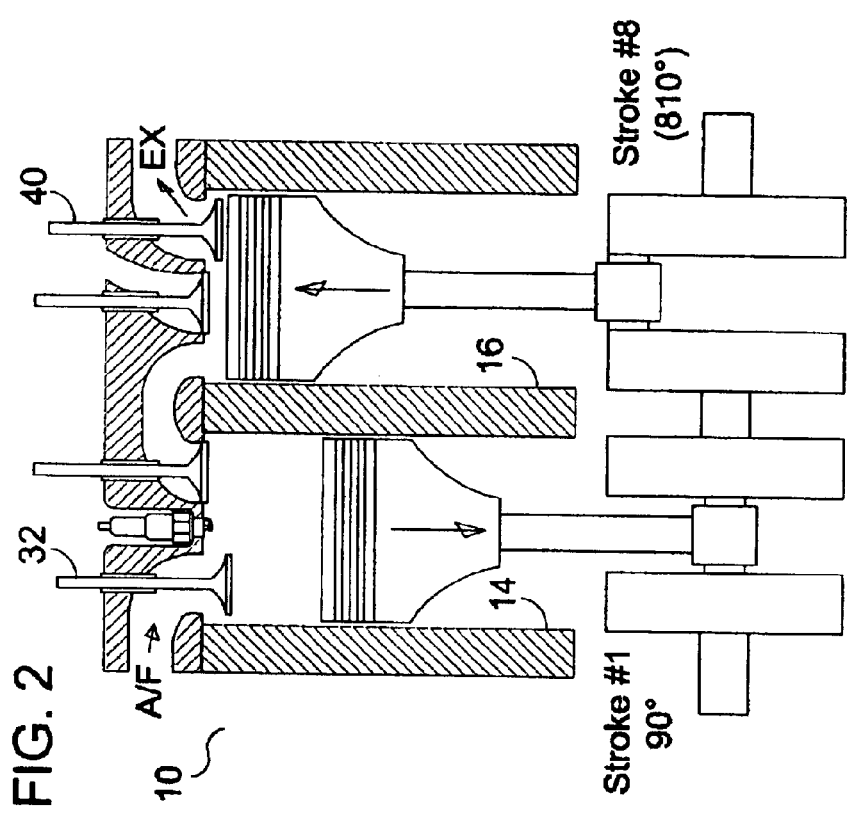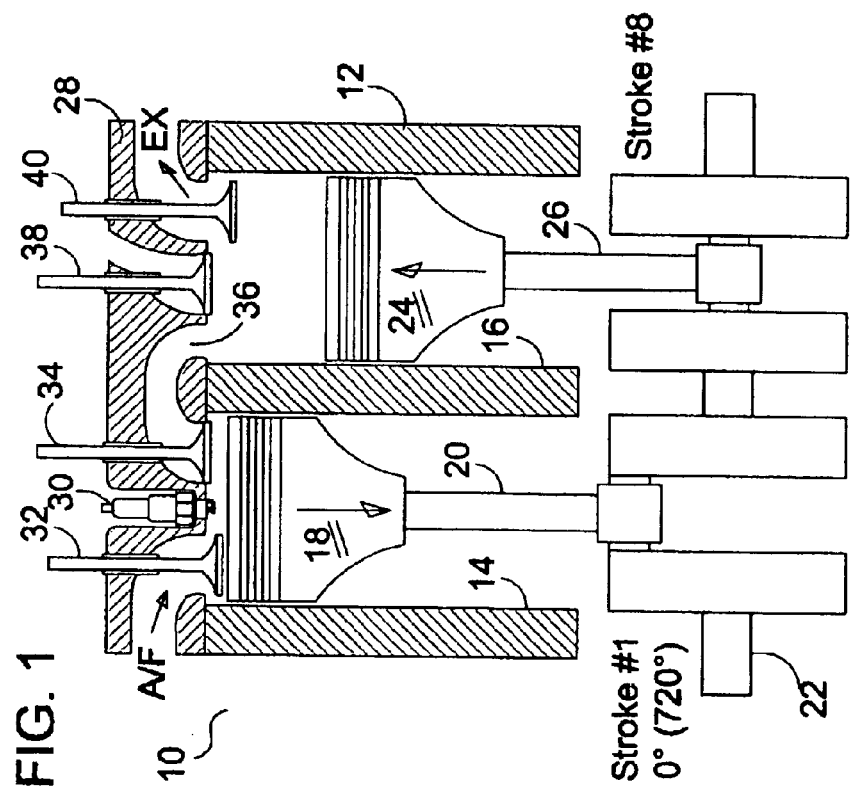

EIGHT-STROKE INTERNAL COMBUSTION ENGINE UTILIZING A SLAVE CYLINDER

FIELD

The present invention is related to an eight-stroke internal combustion engine, which may be used in most any application of present uses of internal combustion engines, such as a transportation vehicle. More-specifically this invention relates to an eight-stroke reciprocating piston driven internal combustion engine utilizing a slave cylinder working in cooperation with a master cylinder.

BACKGROUND OF THE INVENTION

There are two main types of piston driven reciprocal internal combustion engines, they are the spark ignition engines, and the auto-ignition engines, also called diesel engines.

These piston driven reciprocal engines, for the most part, use either a two-stroke cycle or more commonly, a four-stroke cycle. The main parts of these engines are; a cylinder containing a piston with a reciprocal movement which is converted into a rotational movement by means of a connecting rod and a crankshaft, and a cylinder head consisting of at least two valves, one exhaust valve and one intake valve. The four stroke or four cycle engine begins by the piston drawing an atomized air-fuel mixture into the cylinder through the intake valve on the first down stroke, the first cycle; then with the valves closed the mixed gases are compressed on the first up stroke, the second cycle; and at or near the top of the first up stroke, the compressed mixture of air and fuel ignites, by either a spark or by auto-ignition, and the mixture, or most of the gas mixture, combusts to produce a second downward stroke the third cycle, which is the power stroke; the second upward stroke, the fourth cycle, pushes the burnt gas mixture and the remaining un-burned gas mixture out of an open exhaust valve to complete the fourth cycle where the rotary or centrifugal motion created by the process is carried by the flywheel for the cycles to continue until either the fuel is shut off or the spark is discontinued.

The efficiency of the energy produced depends, among other variables, on the amount of air-fuel mixture drawn or forced into the cylinder and the compression volume ratio. The higher the compression volume ratio, the higher the efficiency. The compression volume ratio is limited, in the case of the gasoline engine, by the risk of premature ignition of the mixture and in the case of the diesel engine among other variables, by a sturdy and appropriate combustion chamber.

It is well known that four-cycle and other multi-cycle internal combustion engines produce exhaust gases that contain un-used energy in the form of un-burnt gasses. Many different approaches have been used to both try to capture the un-used energy within these unburned gases and to try to reduce atmospheric emissions caused by inefficient combustion.

Inventor is aware of U.S. Pat. No. 4,917,054 issued to Schmitz on Apr. 17, 1990, "Six-stroke internal combustion engine". This is a reciprocating pistons engine, wherein six strokes used, they are the admission of air, the first compression accompanied or followed by a possible cooling, a second compression followed by a combustion, the first expansion producing a usable work, the second expansion producing usable work and finally the discharge of the combustion gases.

SUMMARY OF THE INVENTION

It is therefore an object of the present invention is to produce an eight-stroke reciprocating piston internal combustion engine with increased fuel efficiency.

Another object of the present invention, is to produce an eight-stroke reciprocating piston internal combustion engine which is less polluting.

By the use of a slave cylinder working in coordination with a master cylinder, the slave cylinder both receives cool atmospheric air and receives hot combustion gases from the master cylinder to create a second power-stroke in the slave cylinder. The increased compression ratio of air in the slave cylinder, allows compressed air to be injected into the master cylinder as the master cylinder is in the later half of it's power stroke, this causes a re-burn of the combustion gasses in the master cylinder. This secondary combustion is transferred from the master cylinder, through the coordinate valve to the slave cylinder to produce a second power stroke within the slave cylinder.

The lower temperature in the slave cylinder makes it possible, by heat transfer, to substantially take full advantage of the heat energy created in the master cylinder.

With the two coordinating cylinders, the master cylinder and the slave cylinder, there are eight working cycles or strokes, each within 90° of crankshaft revolution of each other. The entire working process is from 0° to 810° of revolution crankshaft. The master cylinder cycles work from 0° to 720° of revolution and slave cylinder cycles work from 90° to 810° of revolution. The master cylinder begins to intake air and fuel at 0 degree of revolution and slave cylinder begins to intake air at 90° of revolution.

In a conventional internal combustion engine, the engine metal will absorb the heat energy produced by combustion, and the cylinder will be cooled down by the cooling system. Resulting in wasted heat energy. The eight-stroke piston engine uses cold air in the slave cylinder to combine with the "wasted" heat energy to produce power as when the cool air combines with the heat energy and un-burnt gases, the cool air inside the slave cylinder will expand. Therefore, the expanded air will continue the power cycle within the master cylinder by combusting most of the remaining un-burnt gases and as the master cylinder exhaust, it also produces a second power cycle within the slave cylinder without a spark.

The heat energy-and un-burnt gases from the master cylinder will combine with the cool air in the slave cylinder. This will reduce the temperature in the master cylinder lowering the chance of pre-ignition detonation, thus allowing higher compression ratios and will also result in higher thermal efficiency, as the cooler slave cylinder air absorbs the heat energy and the engine metal will absorb less heat.

Therefore, the embodiment of this invention is an internal combustion engine composed essentially of at least one pair of compressing cylinders. It is plausible that the master cylinder and the slave cylinder could be substantially more or substantially less than 90° off rotation of each other. For ease of explaining this invention the cylinders are discussed herein working 90° off rotation of each other.

It is also plausible that the master cylinder could potentially use a third valve, an exhaust valve to the outside if required. As well it is plausible that the slave cylinder could potentially use a third valve giving more control to the coordinate valve port if required. It is also plausible, the displacement of the master cylinder and slave cylinder could be different. As well, the duration of the valve timing may be varied depending on the application requirements and variables in the engine tuning dynamics. It is further plausible wherein this engine has more than one said slave cylinder for each said master cylinder, or more than one master cylinder for each slave cylinder. It is still further plausible wherein this engine's second power stroke is assisted by introduction of a light fuel such as hydrogen.

In theory, the principle of this eight-stroke internal combustion engine can be applied to both the spark ignition engine and the auto-ignition or diesel engine, and the invention could plausibly use a spark in the slave cylinder if so desired.

BRIEF DESCRIPTION OF THE DRAWINGS

Various other objects, features and advantages of the present invention will become more fully appreciated as the same becomes better understood when considered in conjunction with the following detailed description of an illustrative embodiment and the accompanying drawings, in which like reference characters designate the same or similar parts throughout the several views, and wherein;

FIGS. 1 to 8 are progressive engine strokes from one to eight shown in a sectional elevation view of the engine, FIG. 1 shows the master cylinder intake, stroke #1, at beginning of the stroke and the slave cylinder is in the middle of its exhaust, stroke #8.

FIG. 2 shows the master cylinder intake, stroke #1, at the middle of the stroke and the slave cylinder is finishing its exhaust, stroke #8.

FIG. 3 shows the master-cylinder compression, stroke #3, at the beginning of the stroke and the slave cylinder is in the middle of intake, stroke #2.

FIG. 4 shows master cylinder compression, stroke #3, at the middle of the stroke and the slave cylinder is in the end of intake, stroke #2.

FIG. 5 shows master cylinder ignition, stroke #5, at the beginning of the power stroke and the slave cylinder is in the middle of compression, stroke #4.

FIG. 6 shows master cylinder combustion, stroke #5, at the middle of the power stroke and the slave cylinder is at the top of compression, stroke #.

FIG. 7 shows master cylinder exhaust, stroke #7, at the beginning of the exhaust stroke and the slave cylinder is in the middle of the power stroke, stroke #6.

FIG. 8 shows master cylinder exhaust, stroke #7, at the middle of the exhaust stroke and the slave cylinder is at the end of the power stroke, stroke #6.

DESCRIPTION OF THE PREFERRED EMBODIMENTS

Figure 3:
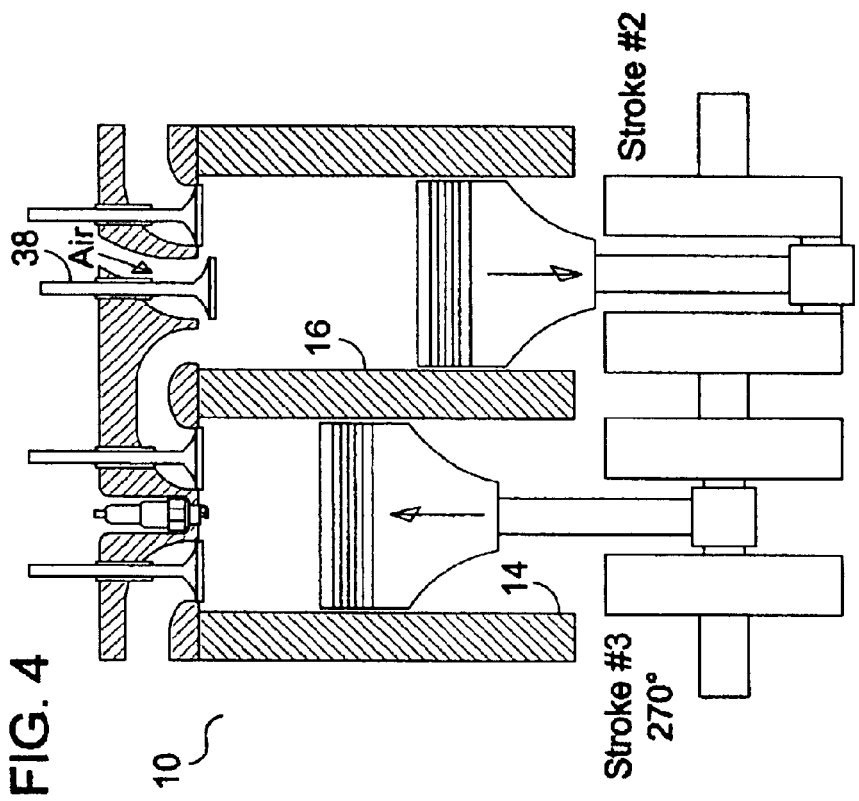

The eight-stroke internal combustion engine is generally referred to as 10, it is shown in a cutaway sectional elevation view, where engine 10 comprises a cylinder block 12, and within block 12, there is a master cylinder bore 14 and a slave cylinder bore 16.

The master cylinder 14 contains a piston 18 which is slidable movable by connecting rod assembly 20, rod 20 is rotationally supported by crankshaft 22, where crankshaft 22 is rotationally supported by cylinder block 12. Slave cylinder bore 16 contains a piston 24 which is slidable movable by connecting rod assembly 26, rod 26 is also rotationally supported by crankshaft 22.

Fixed atop cylinder block 12 is a cylinder head 28. Above master cylinder 14, cylinder head 28 includes a spark plug 30, an intake valve 32 and a coordinate valve 34. Above slave cylinder 16, cylinder head 22 includes an open port 36 to coordinate valve 34, an intake valve 38 and an exhaust valve 40.

As seen in FIG. 1, intake stroke, stroke #1, is at the beginning (0°) of the crankshaft 22 rotation cycle. During rotation, master cylinder 14 intakes air and fuel (A/F) through the master cylinder intake valve 32. At this rotational position the slave cylinder piston 24, is in the middle of its exhaust stroke, stroke #8.

As seen in FIG. 2, intake, stroke #1, is at the middle (90°) of rotation, where the master cylinder 14 intakes A/F through the master cylinder intake valve 32 and slave cylinder 16 is finishing its exhaust stroke:, stroke #8 (810° of its cycle rotation completion, or the beginning of a new cycle of rotation).

As seen in FIG. 3 the master cylinder 14 compression, stroke #3, at the beginning of the stroke (180° of its cycle rotation), where the master cylinder 14 begins compresses A/F and the slave cylinder piston 24 is in the middle of intake, stroke #2, induction of Air only.

Figure 4:
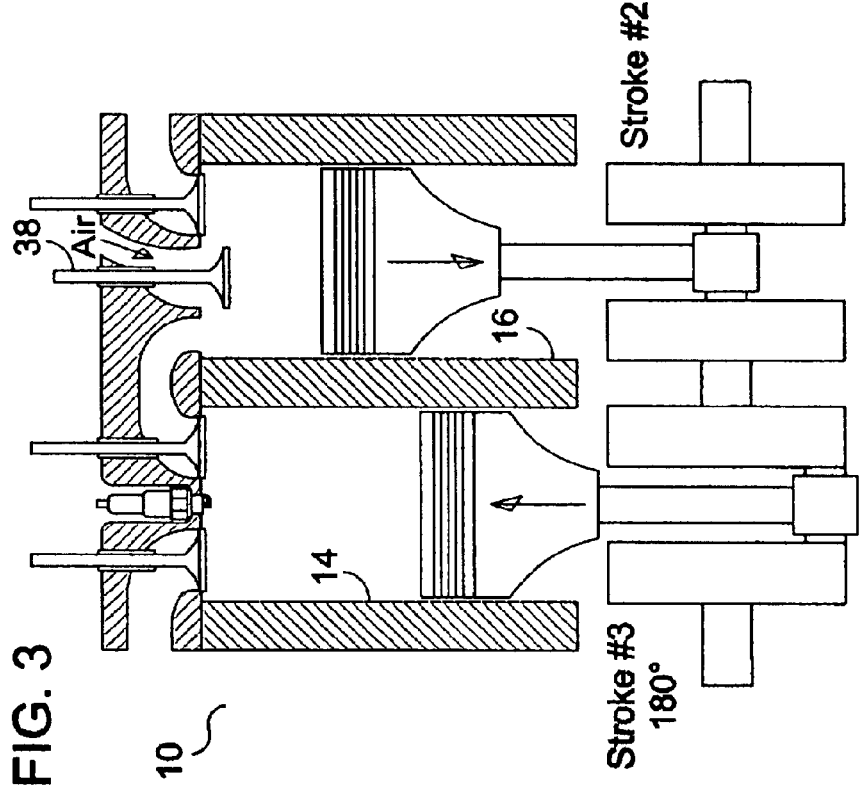

As seen in FIG. 4 master cylinder 14 compression stroke #3, at the middle of the stroke (270° of its cycle rotation), where the master cylinder piston 18 continues compression of A/F and the slave cylinder 16 is in the end of intake, stroke #2.

Figure 5:
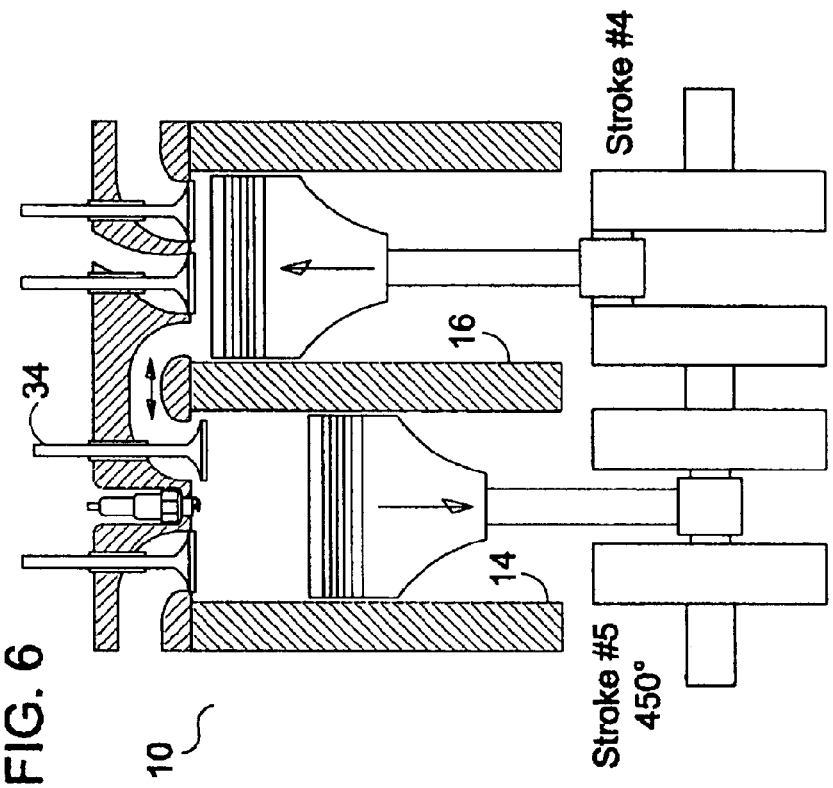

As seen in FIG. 5 shows master cylinder 14, upon sparkplug 30 ignition, stroke #5, at the beginning of the power stroke (360° of cycle rotation), where the master cylinder 14 begins combustion of A/F and the slave cylinder piston 24 is in the middle of compression, stroke #4, where the slave cylinder compresses Air only.

Figure 6:
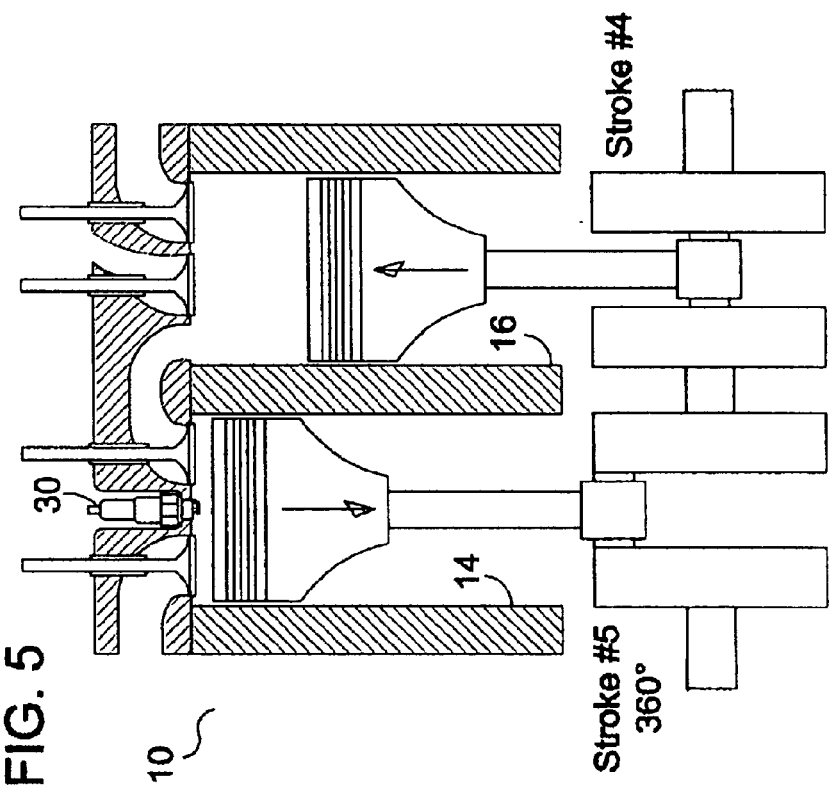

As seen in FIG. 6 master cylinder combustion, stroke #5, at the middle of the power stroke (450° of cycle rotation), where the master cylinder's coordinate valve 34 is already opening (the air from slave cylinder is pushed into master cylinder at about 420 degrees, close to the end of Stroke #4) and the slave cylinder piston 24 is at the top of compression, stroke #4 where the slave cylinder's compressed Air is mixed with combustion gases in master cylinder 14.

Figure 7:
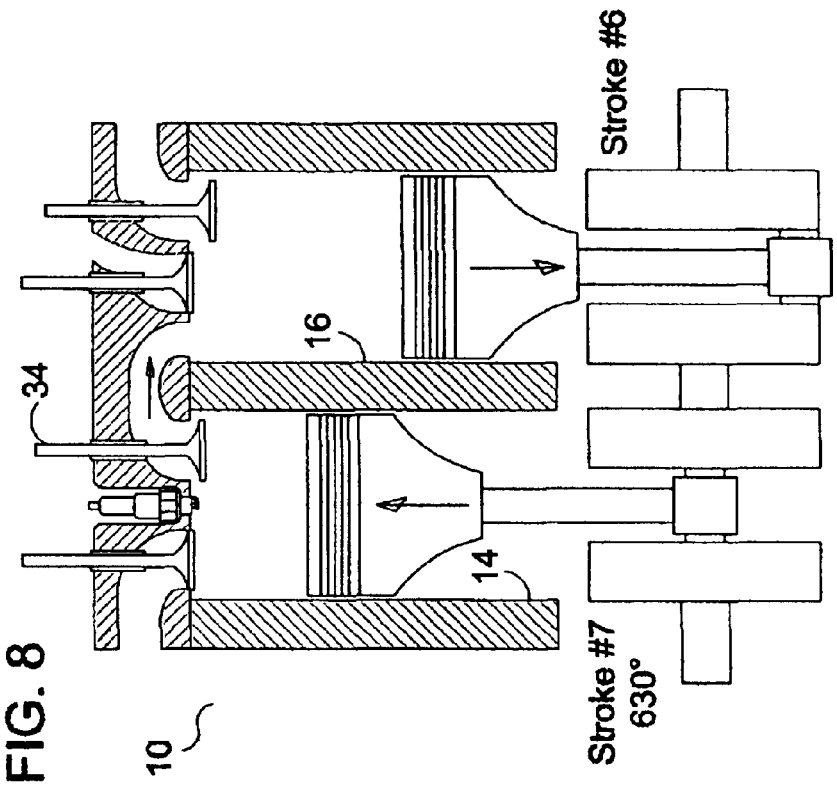

As seen in FIG. 7 manger cylinder 14 exhaust, stroke #7, at the beginning of the exhaust stroke (540° of cycle rotation), where the master cylinder 14 begins to exhaust combustion gases through the coordinate valve and the slave cylinder piston 24 is in the middle of the power stroke, stroke #6, where the slave cylinder 16 continues power stroke as the gases expand and are re-burned within both master cylinder 14 as it exhausts through coordinate valve and into slave cylinder 16 as slave cylinder piston 24 continues its power stroke.

Figure 8:
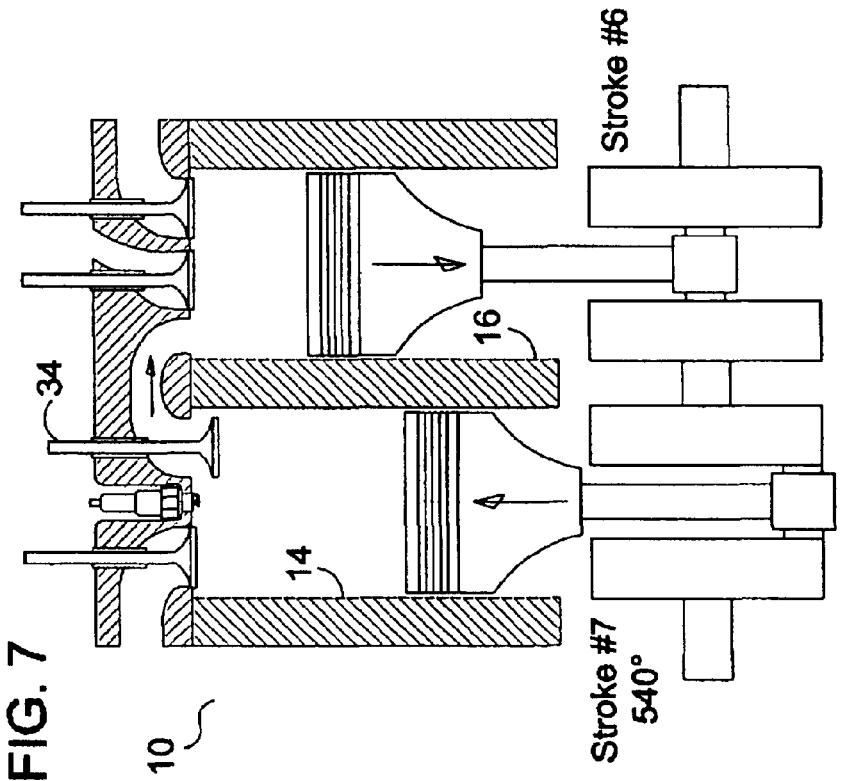

As seen in FIG. 8 where in master cylinder 14, the master cylinder piston 18 is at the middle of the exhaust stroke, stroke #7, (630° of cycle rotation), where the master cylinder piston 18 continues to exhaust combustion gases through the coordinate valve 34 and the slave cylinder 16 is at the end or the power stroke, stroke #6, where the slave cylinder continues to accept the combustion gases from the master cylinder through coordinate valve 34 until coordinate valve 34 closes before the next intake cycle begins.

Figure 9:
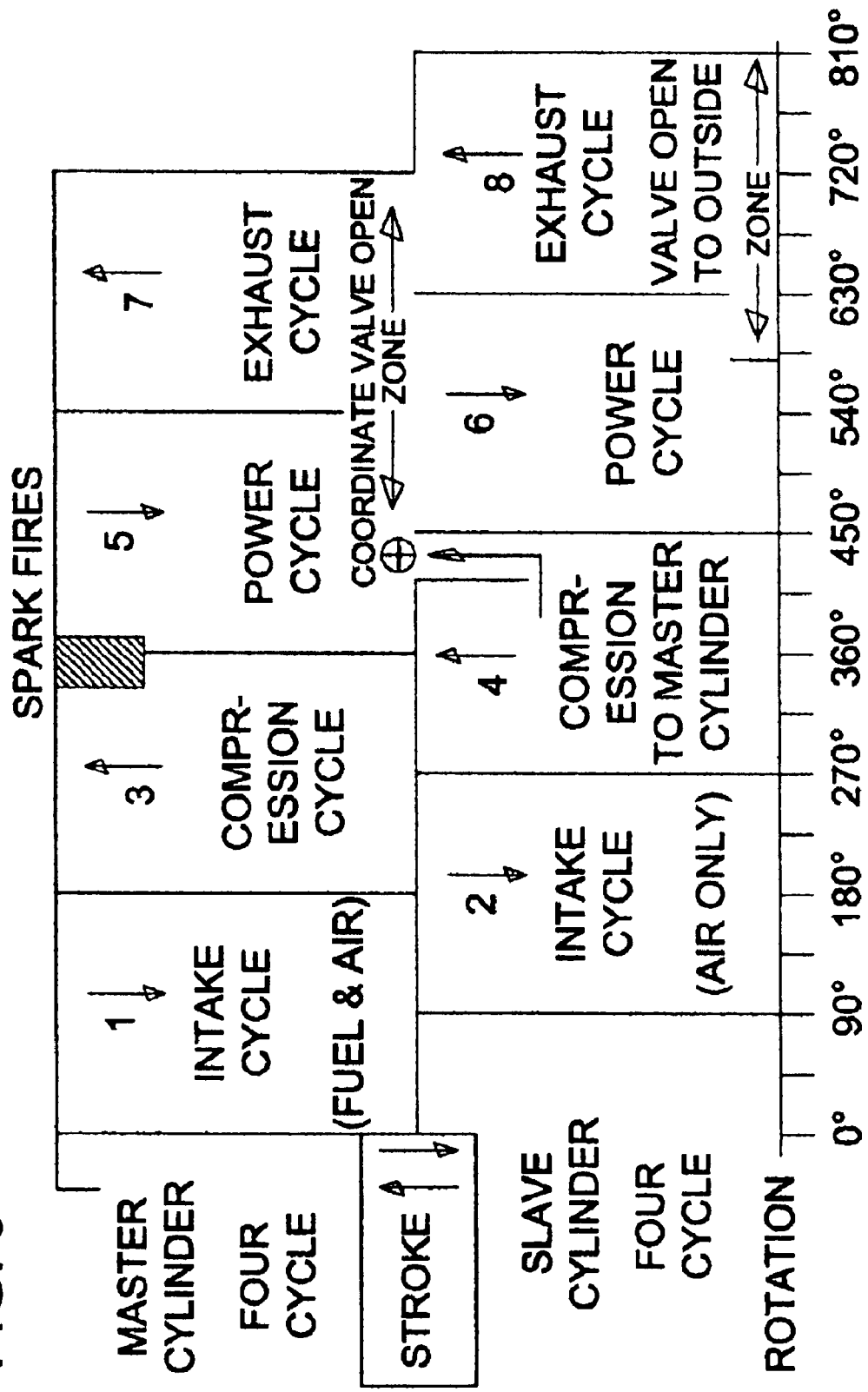
FIG. 9 shows a diagram of the eight-stroke engine working cycles.

As seen in FIG. 9 a diagram showing the eight-stroke engine working cycles.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An multi-cycle, reciprocating piston-type, internal combustion engine comprising at least one master cylinder which includes a reciprocating piston being connected to a crankshaft, and at least one slave cylinder which includes a reciprocating piston being connected to said crankshaft; and an overhead valve means for admission of gases of air and fuel mixture to said master cylinder and admission of air only to said slave cylinder and discharge of exhaust gases from said slave cylinder; wherein the engine comprises at least two cylinders disposed to form a pair, one being said master cylinder adjacent the other, said other being said slave cylinder; and, means for coordinating exchange of gases between said master cylinder and adjacent said slave cylinder, said means for coordinating exchange of gases being a coordinate valve means at a side of said master cylinder, said coordinate valve means including a passage port of sufficient size to permit flow of gases therethrough between said slave cylinder and said master cylinder, said passage port channelling gases through said valve from said master cylinder to said slave cylinder, said coordinate valve means being open at approximately 420 degrees of cycle revolution for initiating a flow of compressed air from said slave cylinder to said master cylinder, said flow of compressed air from said slave cylinder being substantially completed by 450 decrees of cycle revolution.

2. An internal combustion engine of claim 1, where said compressed air from said slave cylinder will combine with heat energy from said master cylinder in said slave cylinder to produce a second power cycle through said coordinate valve without addition of fuel.

3. An internal combustion engine according to claim 1, where said master cylinder and said slave cylinder are operating 60 degrees to 120 degrees apart, with said slave cylinder trailing said master cylinder.

4. An internal combustion engine according to claim 1, wherein said two cylinders are disposed along a line, adjacent the crankshaft to which they are connected.

5. An internal combustion engine according to claim 1, wherein said two cylinders are disposed in a V cylinder configuration, adjacent the crankshaft to which they are connected.

6. An internal combustion engine according to claim 1, comprising a multiple of said master cylinder and said slave cylinder pairs.

7. An internal combustion engine according to claim 1, wherein a second coordinating valve means is located overhead of said slave cylinder working with said coordinating valve means above said master cylinder.

8. An internal combustion engine as claimed in claim 1, wherein said engine is an engine of a type of charged intake.

9. An eight-cycle, reciprocating piston-type, internal combustion engine having a basic unit comprising at least one four-cycle master cylinder and a piston; at least one four-cycle slave cylinder and a piston; means for introducing and firing a fuel-air mixture for said master cylinder; means for introducing air for said slave cylinder; means for transferring expansion gases between said master cylinder and said slave cylinder; and means for coordinating expansion gases between said master cylinder and said slave cylinder and to produce a second power stroke from said slave cylinder, said coordinating means for coordinating exchange of expansion gases between said master cylinder and said slave cylinder is a coordinating valve means at said master cylinder side, said coordinating valve means including a passage port extending between said master cylinder and said slave cylinder for channelling expansion eases from said slave cylinder through said coordinating valve to said master cylinder, and said master cylinder expansion gases to said slave cylinder, said coordinate valve means being open at approximately 420 degrees of cycle revolution, where compressed air from said slave cylinder flows into said master cylinder, said flow of compressed air from said slave cylinder being substantially completed by approximately 450 degrees of cycle revolution; said basic unit including exhaust passage means from said slave cylinder to outside; and wherein said master cylinder and said slave cylinder are operating between 60 and 120 degrees apart with said slave cylinder trailing said master cylinder.

10. An internal combustion engine of claim 9, where said compressed air from said slave cylinder will combine with heat energy from said master cylinder in said slave cylinder to produce said second power cycle without addition of fuel.

11. An internal combustion engine according to claim 9, where said master cylinder and said slave cylinder are operating 90 degrees apart, with said slave cylinder trailing said master cylinder.

12. An internal combustion engine according to claim 9, wherein said master cylinder and said slave cylinder are disposed along a line, adjacent the crankshaft to which they are connected.

13. An internal combustion engine according to claim 9, wherein said master cylinder and said slave cylinder are disposed in a V cylinder configuration, adjacent the crankshaft to which they are connected.

14. An internal combustion engine according to claim 9, comprised of multiples pairs of said master cylinder and said slave cylinder.

15. An internal combustion engine according to claim 9, wherein a second coordinating valve means is located overhead of said slave cylinder, working with said coordinating valve means above said master cylinder.

16. An internal combustion engine according to claim 9, wherein said engine is an engine of a type charged intake.

* * * * *